(12) United States Patent
Yao

(10) Patent No.: US 11,482,844 B2
(45) Date of Patent: Oct. 25, 2022

(54) MONITORING SYSTEM OF CABLE LAYING STATE

(71) Applicant: Zhejiang Landi Electric Power Technology Co. LTD, Jiaxing (CN)

(72) Inventor: Hongjun Yao, Tongxiang (CN)

(*) Notice: Subject to any disclaimer, the term of this patent is extended or adjusted under 35 U.S.C. 154(b) by 742 days.

(21) Appl. No.: 16/513,962

(22) Filed: Jul. 17, 2019

(65) Prior Publication Data

US 2020/0028336 A1    Jan. 23, 2020

(30) Foreign Application Priority Data

Jul. 17, 2018  (CN) .......................... 201810784561.3

(51) Int. Cl.
| | |
|---|---|
| *G01L 5/10* | (2020.01) |
| *H04Q 9/00* | (2006.01) |
| *H02G 1/06* | (2006.01) |
| *H02G 1/08* | (2006.01) |
| *G01L 5/04* | (2006.01) |
| *G01S 19/13* | (2010.01) |
| *H04N 5/225* | (2006.01) |
| *H04N 7/18* | (2006.01) |
| *H01B 11/22* | (2006.01) |

(52) U.S. Cl.
CPC ............ *H02G 1/081* (2013.01); *G01L 5/047* (2013.01); *G01S 19/13* (2013.01); *H04N 5/2253* (2013.01); *H04N 7/183* (2013.01); *H04Q 9/00* (2013.01); *H01B 11/22* (2013.01); *H04Q 2209/30* (2013.01)

(58) Field of Classification Search
None
See application file for complete search history.

(56) References Cited

U.S. PATENT DOCUMENTS

| | | | | |
|---|---|---|---|---|
| 3,400,542 | A * | 9/1968 | Davis ...................... | E02F 5/102 405/175 |
| 3,715,068 | A * | 2/1973 | Clarke ................... | B65H 51/10 226/188 |
| 4,486,861 | A * | 12/1984 | Harmel .................. | G08C 23/02 367/134 |
| 4,960,001 | A * | 10/1990 | Vemmer ................. | G01L 5/101 73/862.392 |
| 2012/0134752 | A1 * | 5/2012 | Eisenhower ............. | H02G 1/10 221/312 R |

* cited by examiner

*Primary Examiner* — John F Mortell

(57) ABSTRACT

The present invention discloses a monitoring system of a cable laying state, comprising: a rotary connector, a composite steel cable and a monitoring system. Both ends of the rotary connector are respectively connected with a laid cable and the composite steel cable, wherein the rotary connector is provided with a tension sensor, a video sensor and an inertial navigation measurement module; and tensile force, video, and inertial navigation information are transmitted to the monitoring system through the composite steel cable. The monitoring system of the cable laying state disclosed by the present invention combines a video technology, a measurement technology and an inertial navigation technology and can monitor an environment in a pipeline, a cable core stress state and a three-dimensional coordinate of an actual path during a cable laying process in real time.

10 Claims, 2 Drawing Sheets

MONITORING SYSTEM OF CABLE LAYING STATE

TECHNICAL FIELD

The present invention relates to the technical field of monitoring of a cable laying state, and particularly to a monitoring system of a cable laying state.

BACKGROUND

In the cable laying process, due to the long-term placement of a laid drainage pipe, etc., there are many abnormal phenomena such as blockage and pipeline misalignment in the pipeline. Although currently a plastic drainage rod is generally pulled manually to dredge the drainage pipe before the cable is laid, corresponding obstructions are formed in the drainage pipe, so that the traction force of cable laying is increased, and when the force is too large, it will cause damage between a conductor core and the insulation, reducing the service life of the cable. At the same time, residues in the pipeline will also wear a cable sheath in the cause laying process, resulting in the reduction of the service life of the cable. Therefore, monitoring for a cable laying state is of great significance to ensure the reliable operation of cable.

Therefore, how to achieve effective monitoring for the cable laying state is an urgent problem to be solved by those skilled in the art.

SUMMARY

In view of this, the present invention provides a monitoring system of a cable laying state, which combines an imaging technology, a microelectronic measurement technology and a gyroscope navigation technology and can monitor the environment and a cable core stress state in a pipeline during a cable laying process in real time and simultaneously draw an actual path of cable laying.

To achieve the above purpose, the present invention adopts the following technical solution:

A monitoring system of a cable laying state comprises: a cable, a rotary connector, a composite steel cable, an electronic cabin and a monitoring system.

One end of the rotary connector is connected with the cable, and the other end is connected with the composite steel cable, wherein the rotary connector is provided with a tension sensor, and the tension sensor is electrically connected with the electronic cabin.

The electronic cabin is provided with a video sensor, a gyroscope and a OPS module; and the electronic cabin transmits information monitored by the tension sensor, the video sensor, the gyroscope and the GPS module to the monitoring system through the composite steel cable.

Preferably, the monitoring system of the cable laying state further comprises: a remote monitoring device wirelessly connected with the monitoring system.

Preferably, the composite steel cable comprises: an optical fiber located at a center, and a shielding layer is arranged outside the optical fiber. A plurality of conductor parts are arranged on the periphery of the shielding layer, the periphery of each of the conductor parts comprises a conductor, an insulating layer, a filling layer and a protecting layer in sequence from inside to outside; and the periphery of each of the conductor parts is wrapped with the filling layer, a sheath and a wire layer in sequence from inside to outside.

Preferably, the rotary connector comprises: a rotary part, a fixed part, the tension sensor, the electronic cabin and a traction part.

The rotary part is rotatably connected with the fixed part.

The tension sensor is located between the fixed part and the electronic cabin, wherein the tension sensor is electrically connected with the electronic cabin through a lead-out wire terminal.

The fixed part is connected with an internal thread of the tension sensor, and the tension sensor is connected with the electronic cabin.

The electronic cabin is connected with the traction part; the traction part is connected with the composite steel cable; the rotary part is connected with the cable, wherein the electronic cabin is connected with the composite steel cable through a signal lead-out wire end.

Preferably, an axial seal coil is arranged between the tension sensor and the electronic cabin.

Preferably, the tension sensor is connected with the electronic cabin through a connecting screw.

Preferably, the electronic cabin is connected with the traction part through the connecting screw.

Preferably, a joint between the electronic cabin and the traction part is provided with a video sensor.

Preferably, the video sensor comprises a camera.

Preferably, the electronic cabin also comprises a ventilating cock and a temperature sensor; the ventilating cock and the temperature sensor are arranged on the end surface of the electronic cabin connected with the traction part; and the temperature sensor is electrically connected with a monitoring terminal.

It is known from the above technical solution that compared with the prior art, the present invention discloses and provides a monitoring system of a cable laying state, which realizes measurement for tensile force in a cable traction process by using a tension sensor. The video sensor is used to shoot and record a pipeline environment in the cable traction process, so as to realize the analysis of a pipeline diameter, realize the monitoring of the cable pipeline environment and the stress state of the cable core in the cable laying process, prevent the damage to a conductor core of the cable and main insulator caused by excessively large traction force and the damage to a cable jacket caused by pipeline residues, thereby ensuring cable laying safety. The gyroscope technology is used to measure angular displacement, velocity, acceleration and other parameters in the cable traction process, so as to record a cable traction trajectory, so that the operation and maintenance personnel can clearly know the position information of the pipeline.

In addition, the existing steel cable, the power line and the signal line are integrated by the present invention, to complete power supply for the system and data transmission while realizing cable traction. The monitoring system can be supervised and viewed through a remote monitoring device, such as a mobile phone, so that project management personnel can realize remote monitoring for the on-site construction state.

DESCRIPTION OF DRAWINGS

To more clearly describe the technical solution in the embodiments of the present invention or in the prior art, the drawings required to be used in the description of the embodiments or the prior art will be simply presented below.

Apparently, the drawings in the following description are merely the embodiments of the present invention, and for those ordinary skilled in the art, other drawings can also be obtained according to the provided drawings without contributing creative labor.

FIG. 1 is a schematic diagram of a monitoring system of a cable laying state provided by the present invention.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
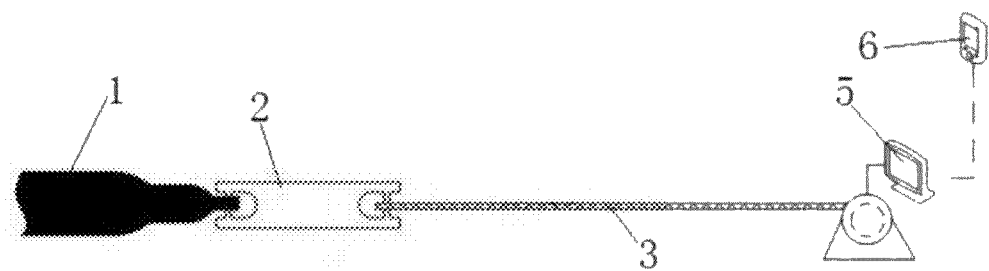

With reference to FIG. 1, an embodiment of the present invention discloses a monitoring system of a cable laying state, comprising: a cable 1, a rotary connector 2, a composite steel cable 3, an electronic cabin 24 and a monitoring system 5.

One end of the rotary connector 2 is connected with the cable 1, and the other end is connected with the composite steel cable 3, wherein the rotary connector 2 is provided with a tension sensor 23; and the tension sensor 23 is electrically connected with the electronic cabin 24.

The electronic cabin 24 is provided with a video sensor 241, a gyroscope and a GPS module; and the electronic cabin 24 transmits information monitored by the tension sensor 23, the video sensor 241, the gyroscope and the GPS module to the monitoring system 5 through the composite steel cable 3.

The monitoring system of the cable laying state provided by the present invention has the following functions:

1. According to the structure of the tension sensor, the rotary connector with the tension sensor is designed to test the range of 0-10 T.

2. The existing steel cable, a power line and a signal line are integrated, to complete power supply for the system and data transmission while realizing cable traction.

3. The CCD imaging technology and the tension monitoring technology are used to monitor the cable pipeline environment and the cable core stress state in the cable laying process, prevent the damage to the cable caused by excessively large traction force and the damage to a cable jacket caused by pipeline residues, thereby ensuring cable laying safety.

4. The gyroscope technology is used to measure the motion parameters during the electric laying process, to draw the cable laying path by processing the measured data.

The monitoring terminal uploads the above measurement information to the monitoring system through an optical fiber communication module, such as an upper computer. The upper computer realizes the analysis of the tensile force and the recording of the video signals through the processing of the detection data, and realizes the recording of the cable traction trajectory in combination with the OPS positioning technology by using the angular displacement, velocity, acceleration and other parameters measured by the gyroscope, so that the operation and maintenance personnel can clearly understand the location information of the pipeline.

To further optimize the above technical solution, the monitoring system of the cable laying state further comprises: a remote monitoring device 6 wirelessly connected with the monitoring system 5.

Specifically, the remote monitoring device can be a mobile phone, a tablet computer, etc., and can be connected with the monitoring system through 4G network, so that the project management personnel can realize remote monitoring of the on-site construction state and understand and grasp the construction state in time, thereby ensuring reliability and safety of cable laying.

Figure 2:
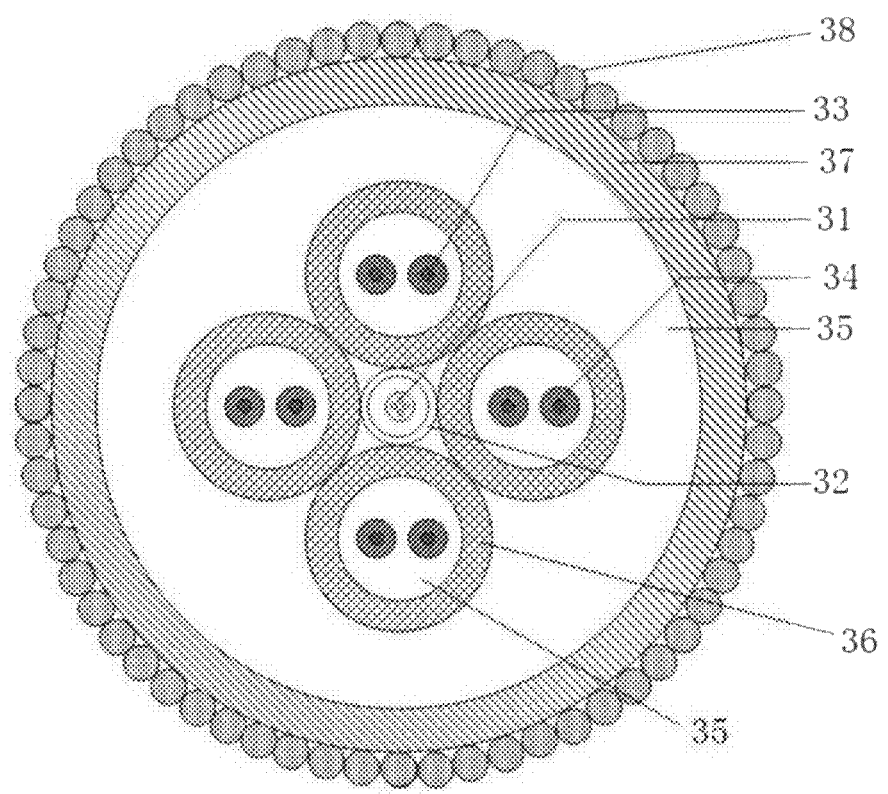
FIG. 2 is a structural schematic diagram of a composite steel cable provided by the present invention.

With reference to FIG. 2, the composite steel cable 3 comprises: an optical fiber 31 located at a center, wherein a shielding layer 32 is enclosed outside the optical fiber 31; and the shielding layer 32, wherein a plurality of conductor parts are arranged on the periphery of the shielding layer 32; the periphery of each of the conductor parts comprises a conductor 33, an insulating layer 34, a filling layer 35 and a protecting layer 36 in sequence from inside to outside; and the periphery of each of the conductor parts is wrapped with the filling layer 35, a sheath 37 and a wire layer 38 in sequence from inside to outside.

The steel cable, the power line and the signal line are integrated by the composite steel cable provided by the present invention, to complete power supply for the system and data transmission while realizing cable traction.

The wire layer is composed of wires which mainly bear the tensile force and realize traction on the cable. The conductor is mainly used to supply power to a monitoring unit. The insulating layer mainly isolates the conductor from other layers, to ensure reliable power supply to the conductor. The optical fiber is mainly used for signal communication to upload the monitoring signal to the computer, so as to ensure the monitoring of the pipeline environment and the tensile force. The sheath is mainly used to bear radial pressure, protect the optical fiber and the conductor against extrusion and protect a power supply line and an optical fiber channel against damage under radial pressure. The filling layer is mainly used to fill the material to prevent water from entering. The shielding layer is mainly used to prevent the power supply line from being disturbed by the signal line, and to ensure reliable transmission of the monitoring signal.

Figure 3:
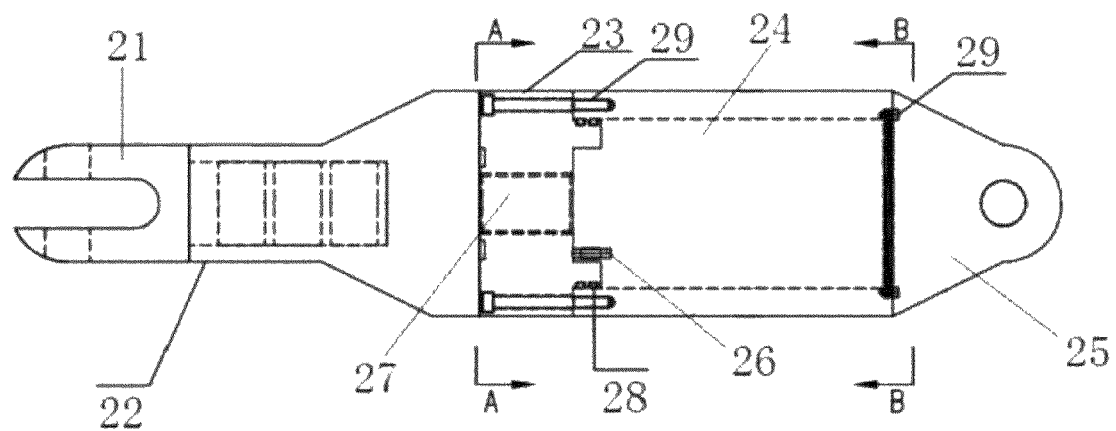
FIG. 3 is a structural schematic diagram of a rotary connector provided by the present invention.
Figure 4:
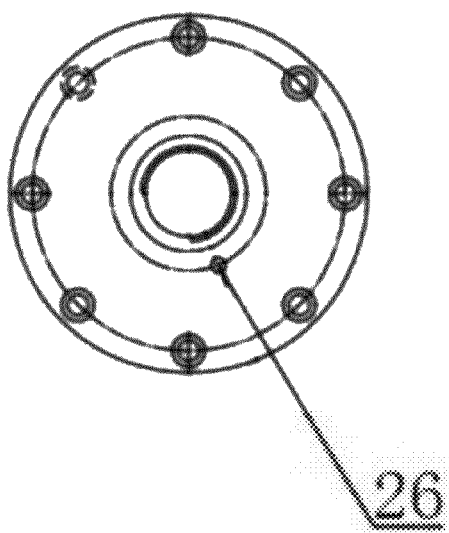
FIG. 4 is a schematic diagram of an end surface of a tension sensor provided by the present invention.
Figure 5:
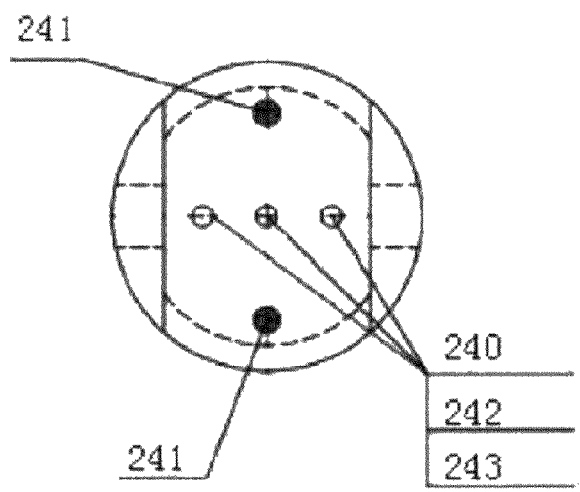
FIG. 5 is a schematic diagram of an end surface of an electronic cabin provided by the present invention.

With reference to FIGS. 3-5, the rotary connector 2 comprises: a rotary part 21, a fixed part 22, the tension sensor 23, the electronic cabin 24 and a traction part 25.

The rotary part 21 is rotatably connected with the fixed part 22.

The tension sensor 23 is located between the fixed part 21 and the electronic cabin 24, wherein the tension sensor 23 is electrically connected with the electronic cabin 24 through a lead-out wire terminal 26.

The fixed part 22 is connected with an internal thread 27 of the tension sensor 23; and the tension sensor 23 is connected with the electronic cabin 24.

The electronic cabin 24 is connected with the traction part 25. The traction part 25 is connected with the composite steel cable 3; the rotary part 21 is connected with the cable 1, wherein the electronic cabin 24 is connected with the composite steel cable 3 through a signal lead-out wire end 240.

The rotary part of the rotary connector provided by the present invention releases the twisting force of a wire rope when the cable is pulled, and at the same time, the tensile force of the rotary connector during the stretching is tested by the measurement of the tension sensor. In the application process, the traction part of the electronic cabin is connected with the cable, and the wire rope or composite steel cable under the tensile force is connected with the rotary connector, thereby realizing the measurement of the tensile force in the cable traction process, and simultaneously satisfying the requirement of releasing the torque in the current cable laying process.

The rotary tension sensor provided by the present invention not only overcomes the problem of difficulty of installing the tension sensor on the wire rope, but also realizes the integration of the system, improves the reliability of the system application, and has high engineering application value.

In addition, it should be noted that the lead-out wire terminal 26 is used to transmit to the electronic cabin the signal measured by the tension sensor, and the signal lead-out wire end 240 is used to transmit to the monitoring system 5 the information monitored by the tension sensor 23, the video sensor 241, the gyroscope and the GPS module.

To further optimize the above technical solution, an axial seal coil 28 is arranged between the tension sensor 23 and the electronic cabin 24.

To further optimize the above technical solution, the tension sensor 23 is connected with the electronic cabin 24 through a connecting screw 29.

To further optimize the above technical solution, the electronic cabin 24 is connected with the traction part 25 through the connecting screw 29.

The fixed part is connected with the electronic cabin through the connecting screw. The fixed part is connected with an internal thread of the tension sensor. The whole system bears the corresponding tensile force by using the screws connected with the tension sensor and the electronic cabin, and the internal thread of the tension sensor, so that the whole system can bear sufficient tensile force in the cable traction process.

To further optimize the above technical solution, a joint between the electronic cabin 24 and the traction part 25 is provided with a video sensor 241.

To further optimize the above technical solution, the video sensor 241 comprises a camera.

To further optimize the above technical solution, the electronic cabin 24 also comprises a ventilating cock 242 and a temperature sensor 243; the ventilating cock 242 and the temperature sensor 243 are arranged on the end surface of the electronic cabin 24 connected with the traction part 25; and the temperature sensor 243 is electrically connected with a monitoring terminal 4. The camera and the temperature sensor are mainly used to detect the pipeline environment and environmental parameters. The environmental parameters are detected to prevent an excessively high operation temperature of the system and to ensure the operation safety of the system.

Each embodiment in the description is described in a progressive way. The difference of each embodiment from each other is the focus of explanation. The same and similar parts among all of the embodiments can be referred to each other. For the device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein. Therefore, the present invention will not be limited to these embodiments shown herein, but will conform to the widest scope consistent with the principle and novel features disclosed herein.

The invention claimed is:

1. A monitoring system of a cable laying state, comprising: a cable (1), a rotary connector (2), a composite steel cable (3), an electronic cabin (24) and a monitoring system (5),
wherein one end of the rotary connector (2) is connected with the cable (1), and the other end is connected with the composite steel cable (3), wherein the rotary connector (2) is provided with a tension sensor (23); the tension sensor (23) is electrically connected with the electronic cabin (24);
the electronic cabin (24) is provided with a video sensor (241), a gyroscope and a GPS module; and the electronic cabin (24) transmits information monitored by the tension sensor (23), the video sensor (241), the gyroscope and the GPS module to the monitoring system (5) through the composite steel cable (3).

2. The monitoring system of the cable laying state according to claim 1, further comprising: a remote monitoring device (6) wirelessly connected with the monitoring system (5).

3. The monitoring system of the cable laying state according to claim 1, wherein the composite steel cable (3) comprises: an optical fiber (31) located at a center, and a shielding layer (32) is arranged outside the optical fiber (31); a plurality of conductor parts are arranged on the periphery of the shielding layer (32); the periphery of each of the conductor parts comprises a conductor (33), an insulating layer (34), a filling layer (35) and a protecting layer (36) in sequence from inside to outside; and the periphery of each of the conductor parts is wrapped with the filling layer (35), a sheath (37) and a wire layer (38) in sequence from inside to outside.

4. The monitoring system of the cable laying state according to claim 1, wherein the rotary connector (2) comprises: a rotary part (21), a fixed part (22), the tension sensor (23), the electronic cabin (24) and a traction part (25);
the rotary part (21) is rotatably connected with the fixed part (22);
the tension sensor (23) is located between the fixed part (21) and the electronic cabin (24), wherein the tension sensor (23) is electrically connected with the electronic cabin (24) through a lead-out wire terminal (26);
the fixed part (22) is connected with an internal thread (27) of the tension sensor (23); and the tension sensor (23) is connected with the electronic cabin (24);
the electronic cabin (24) is connected with the traction part (25); the traction part (25) is connected with the composite steel cable (3) the rotary part (21) is connected with the cable (1), wherein the electronic cabin (24) is connected with the composite steel cable (3) through a signal lead-out wire end (240).

5. The monitoring system of the cable laying state according to claim 4, wherein an axial seal coil (28) is arranged between the tension sensor (23) and the electronic cabin (24).

6. The monitoring system of the cable laying state according to claim 4, wherein the tension sensor (23) is connected with the electronic cabin (24) through a connecting screw (29).

7. The monitoring system of the cable laying state according to claim 4, wherein the electronic cabin (24) is connected with the traction part (25) through the connecting screw (29).

8. The monitoring system of the cable laying state according to claim 4, wherein a joint between the electronic cabin (24) and the traction part (25) is provided with a video sensor (241).

9. The monitoring system of the cable laying state according to claim 8, wherein the video sensor (241) comprises a camera.

10. The monitoring system of the cable laying state according to claim 4, wherein the electronic cabin (24) also comprises a ventilating cock (242) and a temperature sensor (243); the ventilating cock (242) and the temperature sensor (243) are arranged on the end surface of the electronic cabin (24) connected with the traction part (25); and the temperature sensor (243) is electrically connected with a monitoring terminal (4).

* * * * *